United States Patent [19]

Sadler et al.

[11] Patent Number: 4,553,493

[45] Date of Patent: Nov. 19, 1985

[54] WARSHIP WITH STANDARDIZED OPERATING UNITS

[75] Inventors: Karl-Otto Sadler, Hamburg; Willy Schmidt, Ellerbek, both of Fed. Rep. of Germany

[73] Assignee: Blohm & Voss AG, Hamburg, Fed. Rep. of Germany

[21] Appl. No.: 522,362

[22] PCT Filed: Dec. 21, 1982

[86] PCT No.: PCT/EP82/00272

§ 371 Date: Jul. 29, 1983

§ 102(e) Date: Jul. 29, 1983

[87] PCT Pub. No.: WO83/02317

PCT Pub. Date: Jul. 7, 1983

[30] Foreign Application Priority Data

Dec. 22, 1981 [DE] Fed. Rep. of Germany ....... 3150894

[51] Int. Cl.$^4$ .......................... B63G 1/00; B63G 9/00
[52] U.S. Cl. .......................................... 114/1; 114/5; 89/37.01; 340/825.05
[58] Field of Search .................... 114/1, 5–8; 89/37 R, 37 L, 41 D, 40 B, 41 M, 41 SW, 41 LE; 340/825.05; 370/86

[56] References Cited

U.S. PATENT DOCUMENTS 3,080,514 3/1963 Foss et al. .............................. 318/29
3,371,639 3/1968 Schillreff ................................ 114/1
3,732,543 5/1973 Rocher et al. .................... 340/172.5
4,031,838 6/1977 Schmidt et al. ........................ 114/1

OTHER PUBLICATIONS

"Simulation of a Class of Ring-Structured Networks", Jafari, et al, IEEE Trans. of Computers, vol. C-29, No. 5, (1980), New York.
"Shipboard Optical Fiber Data Multiplex System", 225 Electrical Communication, vol. 55, (1980), No. 4, Heidenheim, Deutschland, F. Pandozy, (1980).
"Le Systeme de Conduite de tir Sea Archer", Pebue Internationale de Defense, Band 10, No. 6, Dec. 1977, (Interavia, Geneve).
Computer Design, vol. 19, 10/1980, "A Distributed Processing System for Military Applications".

*Primary Examiner*—Trygve M. Blix
*Assistant Examiner*—Edwin L. Swinehart
*Attorney, Agent, or Firm*—Townsend and Townsend

[57] ABSTRACT

A warship with individual standardized operating units and a central command post unit has standardized information transmission lines independent of the type of units arranged on the individual standard platforms. A data processor (11', 11'', 12' to 31') is provided inside each standardized operating unit (11, 12 to 31). The information to be transmitted is brought into a suitable form for transmission via the standard information transmission lines. Furthermore, the information received via the standard information transmission line is transformed into a form suitable for processing in the standardized operating units (11, 12 to 31).

9 Claims, 1 Drawing Figure

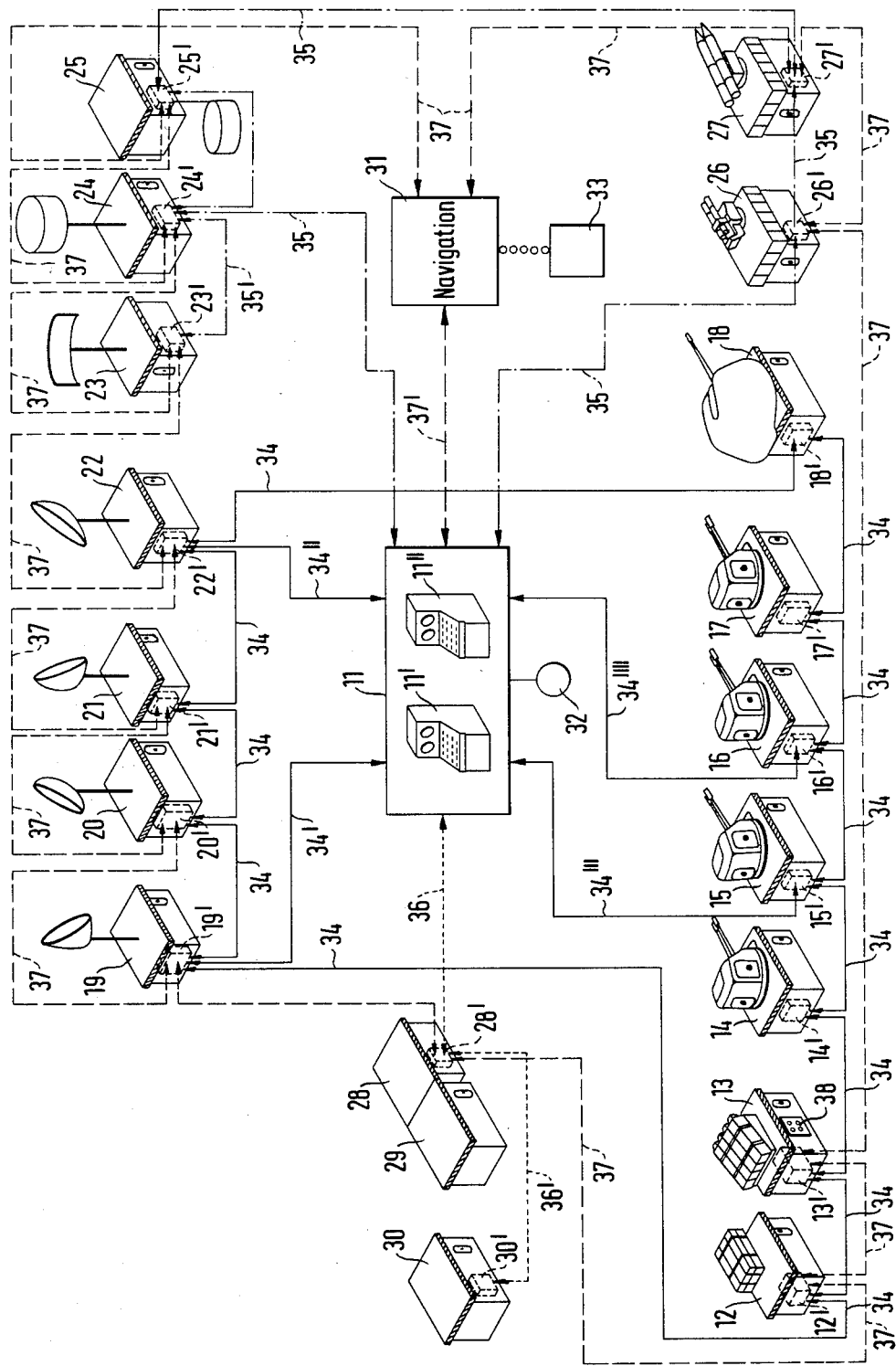

WARSHIP WITH STANDARDIZED OPERATING UNITS

The invention relates to a warship in accordance with the precharacterising part of patent claim 1.

In a known warship of this kind (German Pat. No. 20 56 069) a significant rationalisation is obtained during manufacture in that the weapon units, the fire control units, the floodlight units and/or the position finding units are prepared on standard platforms outside of the ship in special factories, and in that the standard platform provided with the unit then only needs to be mounted on a standard foundation provided in the hull of the ship. The known system of standardised operating units not only makes it possible to manufacture warships economically but also makes it possible to change out obsolete units in a simple manner, simply by removing the standard platform carrying the old unit from the standard foundation and by replacing it with a platform equipped with a modernised or new unit. This can take place within a very short period of a few days, whereas previously months of conversion work were necessary for this purpose. The modernised or new unit can namely also have been previously prepared in a special factory on a suitable standard platform.

To the extent that apparatus located outside of the container, for example an antenna mounted on a mast, needs to be arranged relatively high above the deck of the ship, the container can be housed at a suitable location in the ship, and can be connected with the apparatus mounted at a remote location via a line. The command post unit is also preferably housed in a container in the interior of the ship.

All the units mentioned here are standardised operating units which is intended to mean that, as far as possible, all of the total elements necessary for the operation of the unit are contained in as compact a form as possible in the unit so that a complete interchange of the unit is possible without a great deal of disassembly work. The standard operating units are in particular housed in containers which—to the extent that they are not located in the interior of the ship—should each be closed at the top by the mentioned standard platform on which the apparatus belonging to the unit (for example a cannon) is mounted.

Two or more different standard foundation/standard platform types (for example of different dimensions) can also be provided.

A problem with the known system of operating units lies however in the fact that information transmission lines between the individual units of the ship and between the units and the command post unit must be present in a very large number. By way of example approximately 200 km of data cable must presently be laid within the ship in order to be able to effect all the information transmissions between the units and the command post unit. For this purpose cable tracks must be constructed and the cables laid, secured, cast to the bulk heads, and provided with plugs. This not only signifies a considerable amount of work but also brings about a quite considerable increase in the weight of the ship which is undesirable. Particularly disadvantageous is the fact that on replacing old units with modernised or new units all the cabling apart from the current supply must be newly executed. Despite the advantages provided by the system of standardised operating units this represents a considerable disadvantage and it should be born in mind that some of the standardised operating units require up to 40 pjugs with, in each case, up to 40 pins in order to be able to effect the required exchange of information with other units or with the command post.

The object of the invention is thus to provide a warship of the initially named kind in which the mechanical standardisation through provision of standardised operating units, and in particular standard foundations and standard platforms carrying the units, is supplemented by an electronic standardisation which makes it possible not only to considerably reduce the costs of and effort of cabling between the units and the command post, but also makes it possible to dispense with the need for new cabling each time some or all of the standard operating units are replaced by new or modernised standard operating units, likewise mounted in standard containers and in particular on standard platforms.

In order to satisfy this object the invention envisages that standard information transmission lines are laid between the operating units of a functional group independently of the type of units arranged on the standard platforms, and that a data processor is provided inside each standardised operating unit to bring the information to be transmitted into a form suitable for transmission via the standard information transmission line, and to bring the information received via the standard information transmission line into a form suitable for processing in the standardised operating unit.

Thus, in accordance with the invention, the standard foundations which are fixedly built into the ship are supplemented by a standard transmission line system which is built into the ship in just the same way as the standard foundations and can be used for all the units built into the standard foundations by means of standard platforms. The standard information transmission line system is only individualised to a degree such that only fire control units, for example, can be built into specified standard foundations, that only abovewater or underwater weapon units, for example, can be built into other standard foundations and that the command post unit, a fire control unit or the like can only be mounted at specific locations in the ship. In other words only one specific type of unit, such as a weapon unit or a position finding unit can be built into each standard foundation, the type or special construction of the unit is however in other respects immaterial, by reason of the standard information transmission line system of the invention, because the data processor built into the unit can bring all the data into a form compatible with the standard information line system.

It is for example possible to mount a modern rocket weapon in place of an obsolete cannon, or a modern fire control unit in place of an old one, in a standard foundation by means of a standard platform without requiring new cabling. A command post unit contained in a container can also be replaced by a new one at any time. The fact that only crude information is exchanged between the units, which cannot be prepared by the individual data processor provided for each unit, is particularly significant for the reduction in complexity of the cabling. Thus every avoidable transmission of information and data between the units themselves and between the units and the command post is dispensed with.

The crude information, for example in the case of a weapon, can relate to aiming, to ballistics, to munition specific data or to restrictions on the range of the weapon.

The decentralisation of the control of the units brought about in this way has the great advantage that the individual units remain operable to a restricted degree on destruction of the operations center during battle. For this purpose, in accordance with a preferred embodiment, keyboards for hand control can be provided at each controlled unit. The individual weapons can thus still be operated using this keyboard because the characteristic data for the particular weapon is present in decentralised form in the associated data processor.

Control of the weapon normally however takes place from the fire control unit which delivers the crude information such as direction and range via the standard information transmission line.

The construction in accordance with the invention makes it possible to reduce the cabling complexity in comparison with the known standardised operating unit system to $\frac{1}{3}$ or $\frac{1}{4}$.

As a result of the association of an individual data processor with each unit it is basically possible to make do with a single cable instead of the 30 information cables that were previously necessary. For reasons of redundancy one operates, however, even with the new system in general with from two to five information cables.

Both classical cables and also coaxial cables, and in particular glass fiber cables which permit particularly high data speeds are suitable cables for the standard information transmission line system of the invention.

In order to provide redundancy it is further advantageous if the data processors are constructed so that each of the several standard information transmission lines between units belonging to different functional groups can take over the total information transmission. If a standard information transmission line between two units becomes inoperative the other line can thus take over the total information transmission, which admittedly takes place somewhat more slowly but nevertheless continues to ensure a complete flow of information.

It is particularly advantageous if the standard information transmission lines correct all the units of a functional group to a ring. The information is, in this arrangement, transmitted by two routes from one unit to the other or from the command post to one unit, so that on interruption of the ring at one point the full flow of information continues to be ensured.

In order to increase the redundancy additional standard information transmission lines can however be laid between specific units of a functional group and/or the command post in dependence on the significance of the unit concerned for the total system.

As already mentioned several standard information transmission lines can be laid electrically in parallel but spatially separated in order to ensure additional security for the transmission of information in the event of damage.

Particular significance in connection with the invention is attributed to the recognition that the units should be subdivided into functional groups in order to provide a standard information transmission line system. Controlling units (sensors) and controlled units (effectors) are associated with one another in functional groups. For example a rocket control unit is combined with a rocket firing unit into a functional group or a torpedo control unit is combined with a torpede firing unit into a functional group.

A practical realisation of the thought underlying the invention provides that the fire control units for the abovewater weapon units, and also the command post unit, form a first functional group and that with preferably several, and in particular four, fire control units at least one standard information transmission line leads directly from some of these units, and in particular from two of them, to the command post unit; and in particular in that with several abovewater weapon units, and in particular seven such units, at least one standard information transmission line leads directly from some of these units, and in particular from two of them, to the command post unit.

Furthermore, it is expedient for the fire control units for the underwater weapons and also the command post unit to form a second functional group.

The communication units and also the command post unit should also form a third functional group. Finally, the fire control units, the command post unit and a navigation unit should form a fourth functional group which is of particular significance on a ship. The rocket and/or torpedo units and, optionally, at least one communication unit should also belong to the fourth functional group.

A particular advantage of the invention resides in the fact that shipboard units which at the present time still operate extensively in analog manner can readily be made suitable for the standard information transmission line system of the invention by analog/digital converters built into the data processors. For future units which from the outset will operate in digital manner the compatibility with the standard information transmission line system of the invention is present from the very beginning.

A land connection is preferably provided on the ship by which some, or all, of the functional groups can be connected to an external simulation, diagnosis and/or evaluation computer.

The thought underlying the invention can be expressed by the statement that the functional units of German Pat. No. 20 56 069 are equipped with their own intelligence for processing or manipulating and for distributing and forwarding data. Through the very much higher transmission speed for the exchange of information (digitised by the data processors) between the units mounted on standard platforms and forming the operating units, considerably more data per time interval can be transmitted which signifies the realisation of a more copious information exchange with reduced cable complexity. The individual intelligence provided for each unit takes over the conversion of the digital information in the data bus into analog information for processing in the unit and vice versa.

The units attached to the standard platforms are housed in containers which are of rectangular shape beneath the platform and which carry at the top, on the platform, a weapon, a position finding device or the like belonging to the unit.

By reason of the ring-like combination of the units belonging to one functional group all the generated information can reach each unit of the functional group. The manipulation and processing takes place irrespective of whether this information is required for the respective system concept or not.

The standardised data processor for each unit mounted on a standard platform has all the customary interfaces for the exchange of information with the unit and, via a normed process, for the exchange of information between various units.

For this reason the complexity of the cabling between the units can be minimised. On the whole the standard information transmission line system of the invention makes possible a considerably increased redundancy when compared with the classical data transmission systems.

The possibility of using programs inside the individual data processors for fault finding, training, system matching and simulation allows these activities, which are personnel and time intensive, to be sensibly facilitated and/or carried out more quickly.

All the required external information can be generated by means of the simulation programs within the data processors of the individual units. On this basis functional testing of the units can be carried out without the other-wise necessary external units and devices being available.

The exchange of standard platforms equipped with units, for example weapon units or fire control units, for the purpose of conversion or later modernisation is straight-forwardly possible using the same standard information transmission line system. It is only necessary to construct the standard data processors within the individual units appropriately.

The data processors of the individual units are formed by an information, computing and storage unit which is of modular construction.

These modules are so constructed that they contain computing units, memory units, power supplies and interface modules for process control, for linking the units between one another and for linking the units to the command post.

The arrangement of the invention makes it possible to simulate the manner of operation of as many units as desired in simple manner in order to test the operation of the total system.

It is of particular significance, as stated, that a specific unit can operate automatically even when it can no longer communicate with the remaining system.

The time regulation is controlled by an internal clock while varying data is continuously updated by extrapolation for a specified time. The data processors can also be used as an adjustment aid when servicing a functional unit. By way of example one can generate control pulses at a specific rate in order to realise a semi-automatic measuring method. The total system consists of standardised hardware and software modules. This provides favourable preconditions for the logistics and simplifies the servicing of the hardware and the care of the software.

The standardisation of the software relates not only to a unification of the programs but also to norming of the transmitted information, i.e. a uniform format for the data sets is ensured.

As an option, each data processor can be equipped with an additional audio channel. In this way oral information from one unit (operating unit) can be transferred to any other unit as desired via analog to digital converters and the channels of the information net. This is a valuable possibility, particular during commissioning and during tests. A further important test aid is a connection for a pocket terminal as a combined input/output device for checking the data processors and the total system. Retrospective changes of the information net are possible at any time through the modular construction of the system, even after commissioning of the ship.

The information net operates automonously. Inside the net there is no data processor which exerts governing control functions over other data processors. Each data processor transmits relevant data to all other data processors and receives data from all other data processors, provided the relevant units associated with the data processors belong to a common functional group.

Suitable algorithms ensure that the relevant data is timely available for all the data processors, that rapid data has priority over slow data, that disturbed transmission channels are recognised and indicated, and that alternative routes are sought when channels are overloaded or inoperative.

When one channel becomes inoperative during a data transmission this is recognised and the already transmitted part quantity is rejected. In a defined region there is to be found backup of the information with which the transmission can be started anew.

The invention thus provides a standard interface for the electronics for the standard interface between the units and ship (standard foundation) provided by German Auslegeschrift No. 20 56 069, in as much as an individual data processor associated with the unit is connected to the standard information transmission line system.

The transmission systems operate with addressed data. Microprocessors can be used for asynchronous data transmission, multiplex method or parallel data transmission. Special cables with, for example, sixteen leads are suitable for the latter.

The invention will now be described in the following by way of example and with reference to the single FIGURE of which shows a schematic block circuit diagram of the units arranged on standard platforms and contained in a warship in accordance with the invention, and of the standard information transmission line system associated with the warship.

As seen in the drawing a command post unit 11 in which for example two data processors 11', 11'' are provided, is located in the ship at a central position, for example on the bridge. At the command post unit one or more persons feed in the target which is to be followed and fought. The command post 11 receives signals representative of the direction of the ship relative to north, a speed signal, a wind speed signal etc. from a navigation unit 31, which contains compasses, a log, a wind speed measuring device, a Decker navigator, an omega navigator, a satellite navigator etc. The corresponding values can be read off from appropriate slave display devices in the command post unit 11.

Various units are located on standard platforms or standard containers arranged in standard foundations (not shown) of the ship as follows:
Rocket firing unit (ASPIDE) 12
Rocket firing unit (OTOMAT) 13
40 mm cannon 14
40 mm cannon 15
40 mm cannon 16
40 mm cannon 17
127 mm compact cannon 18
fire control unit (STIR) 19
fire control unit (LIOD) 20 (starboard)
fire control unit (LIOD) 21 (port)
fire control unit (WM 25) 22
radar unit (DA 08) 23
rocket control unit (ECM/ESM) 24 torpedo control unit (SONAR) 25
underwater rocket firing unit 26
torpedo firing unit 27
communications center container 28, 29
remote signalling device container 30.

A sensor system 33 accepts the data from the ships engines and delivers it to the navigation unit 31.

32 designates a land connection by means of which the entire system can be connected to an external simulation, diagnosis and/or evaluation computer which is not illustrated.

In accordance with the invention an individual data processor 12', 13', 14', . . . 26', 27', 28' and 30' is also arranged in each unit container or in each unit arranged at a standard platform.

The data processors contain memories in which all the specific data for the associated unit itself are stored. For the weapon units 12 to 18 and 16, 27 this data can for example be data relating to aiming, ballistics, data specific to the munitions, restrictions on the range of the weapon etc.

In this manner the individual weapon unit need only be supplied with crude information which is relatively simple to transmit and which consists essentially of a direction signal and a range signal.

In order to effect this transfer the abovewater weapon units 12, 13, 14, 15, 16, 17 and 18 are combined with the associated fire control units 19, 20, 21, 22 as standard functional groups to a ring system in which, in each case, the data processors of subsequent units are connected together by means of standard information transmission lines 34 shown as broken lines. In the illustrated embodiment the data processors 12', 13', 14', 15', 16', 17', 18', 22', 21', 20', 19', 12' are in each case connected together by a standard information transmission line 34. The command post unit 11 could also be included in this ring line system. In the present case the command post unit 11 is however connected via a line 34' with the data processor 19' of the fire control unit 19, via a further standard information transmission line 34" with the data processor 22, via a further line 34''' with the data processor 15' of the cannon unit 15 and, finally, via a fourth standard information transmission line 34'''' with the data processor 16' of the cannon 16.

The fire control units 19 to 22 are told which target is to be followed by digitised signals from the command post unit 11 via the standard information transmission lines. As addressed data is transmitted via the lines 34', 34" the data processors 19', 20', 21', 22' can seek out the signals intended for them from the totality of the transmitted signals. These control signals also specify which of the abovewater weapons 12, 18 is associated with which of the fire control units 19, 22.

The data processors 19' to 22' of the fire control units 19, 22 then transfer the required control signals to the data processors 12' to 18' of the abovewater weapons 12 to 18. Starting from each fire control unit two paths are available for this purpose via the ring line system 34 (in both directions of the ring) so that if the ring is interrupted in some way, for example by a projectile hit, a second path for the signal transmission is available.

In the present embodiment a considerable redundancy is also provided by the starlines 34' to 34''''.

Microprocessors for asynchronous data transmission, multiplex devices or parallel data transmission devices are suitable as microprocessors and either classical cable, or coaxial cable or glass fiber cable can be used as standard information transmission lines 34, 34', 34", 34''' and 34''''.

As a result of the arrangement of data processors both in the central command post unit 11 and also in each of the individual operating units, or in each individual unit, the information to be transmitted from the command unit 11 to the units or between the units, can always be brought into such a form that one can always use one and the same standard information transmission line system 34, 34', 34", 34''', 34'''' irrespective of the special nature of the individual unit. This also applies when one of the units is replaced by a modernised or a new unit.

It is however important that, in the described manner, the fire control units 19 to 22 are combined into a first functional group with the abovewater weapons 12 to 18.

As a result of the arrangement of the invention which provides an individual intellegence in the individual units it is not only possible to provide a standard wiring or cabling within the ship which can be retained even when exchanging some of the units, but also possible to significantly reduce the total requirement for cable material, for example to ⅓ or ¼ of the cabling expense necessary with a classic system.

The fire control units 23, 24, 25 for the underwater weapons (underwater rocket unit 26 and torpedo firing unit 27) are combined in accordance with the invention in a second functional group, the standard information transmission lines 35 of which are shown in chain-dotted lines. The ring line 35 leads from the command post unit 11 via the data processor 24' of the fire control unit 24 to the data processor 25', from there to the data processor 27' of the torpedo firing unit, 27, from there to the data processor 26' of the underwater rocket firing unit 26 and from there finally back to the command post unit 11, so that once again a functional group connected by a standard information transmission line 35 is present, with the same advantages as described above with reference to the system connected by the ring line 34.

A radar unit 23 provided for all sensors is connected by means of the inbuilt data processor 23' to the data processor 24' of the fire control unit 24 via a line 35'.

Weapon control data in digitised form is transmitted to the weapon units 26, 27 via the standard information transmission lines 35, 35', with the signals likewise consisting only of crude information, whereas all the particulars specific to the weapons 26, 27 are stored in the data processors 26', 27'.

A third functional group is formed by communication center units 28, 29 and a container 30 with communication apparatus. The data processor 28' of the unit 28 and the date processor 30' of the communication unit 30 are connected to the command post units 11 and to one another via the standard information transmission lines 36, 36' illustrated in dotted lines. Communication data such as teletype data, command transmission within and outside of the ship etc., are transmitted via the lines 36, 36' which can fundamentally also be completed into a ring line.

The navigation unit 31 which transmits compass signals, ships speed signals, wind speed signals etc. in digitised form is of particular significance abord the ship. The units fed by the navigation unit 31 form a fourth functional group which is completed by standard information transmission lines 37 illustrated in broken lines. The ring line 37 fed by the navigation unit 31 includes all those units, or the data processors arranged therein, which are dependent on signals or information from the navigation unit 31.

This primarily involves the command post unit 11, however also the fire control units 19 to 25, the communications center units 29, 28 and also the rocket weapon units 12, 13, 26 and 27. Whereas all the units requiring information from the navigation unit 31 are combined by the standard information transmission lines 37 into a single ring the command post 11 is connected by a separate standard information transmission line 37' with the navigation unit 31.

The rocket weapons 12, 13, 26 and 27 need the navigation signals as a reference for rocket launching.

From the above description it can be seen that the individual functional groups overlap in part. Thus, by way of example, the weapon units 12, 13 and the fire control units 19 to 22 belong both to the first functional group connected by the ring line 34 and also to the fourth functional group connected by the ring line 37.

Although basically only one standard information transmission line is required between the data processors of neighbouring units, for example 19, 20, the combination to functional groups, which in the example of the units 19, 20 requires two lines 34, 37, is preferred because, in the event that one of the two lines 34, 37 fails, the other line which remains intact can take over the data transmission which admittedly is only possible at a lower speed but still leaves the total system intact.

The data processors should thus be so constructed that on failure of one line the remaining line or lines can take over the transmission of information.

Redundancy can also be achieved, apart from the provision of the star-like additional standard information transmission lines, by connecting several standard information transmission lines in parallel, with these standard information transmission lines usefully being laid at spatially distinct locations.

For the sake of simplicity the current supply lines for the individual units are not shown in the drawing. They are arranged and laid in the classical manner.

A keyboard 38, by way of example, is arranged at the container of the weapon unit 13 and can also be present at all the other weapon units. This keyboard serves to allow manual operation of the weapon on failure of the command center and/or the fire control units. This is possible because an individual data processor is provided in each weapon, for example the data processor 13' in the weapon 13, with the data processor executing the necessary corrections and limitations for the associated weapon. Thus the weapon can still be operated manually if the operations center breaks down.

Each individual weapon unit can also be tested at any time for example with the aid of plug-in cards.

Only plug contacts for the power supply and, optionally, a voice link are provided at the individual units in addition to the cable connections for the standard information transmission lines.

By reason of the arrangement of data processors in each weapon unit it is also immaterial whether the individual unit operates on analog or digital lines because the required analog to digital converters can readily be built into each data processor should this be necessary.

The ring line 35 for supplying the navigation signals to the individual units has shown itself to be particularly advantageous because, by way of example, up to eighty cables had previously to be laid from the compass of the ship to the individual units and have now been replaced by a single ring line.

If a unit container is replaced by a new or modernised unit container it is only necessary to release the plug contacts of the old container, whereupon the old container can be removed and a new container with a new unit inserted. This new container has the same connection contacts and sockets as the old container, so that after mounting it is only necessary to reestablish the plug connections. The total system is then at once capable of further operation. Any differences between the new unit compared with the old are taken into account by appropriate arrangement of the data processor of the new unit.

The data processors used in the units in accordance with the invention receive and deliver, exclusively, digitised signals from and to the standard information transmission lines.

We claim:

1. A warship having a central command post unit, a navigation unit, a communication unit, and a plurality of standardized operating units including controlling units and controlled units, each of which includes a container which is closed at the top by a standardized platform, wherein power supply lines and information lines connected to the central command post unit and/or to other standardized operating units terminate at each standardized operating unit, comprising:
   a plurality of data processors, each having standardized hardware and software modules and being located inside a standardized operating unit such that the associated standardized operating unit is capable of operating independently of the other standardized operating units, each data processor including a memory for storing data specific to the associated standardized operating unit;
   said controlling and controlled standardized operating units forming functional groups;
   said data processors of the standardized operating units which belong to the same functional group only exchanging digitized crude information; and
   standardize information transmission lines laid between the data processors of the standardized operating units of a functional group independently of the nature of the different standardized operating units;
   whereby each data processor provides a standardized electronic interface equipped with the same connection contacts and sockets.

2. A warship in accordance with claim 1, further comprising a keyboard for hand control at each controlled standardized operating unit.

3. A warship in accordance with claim 1 or claim 2, further comprising at least one additional standardized information transmission line laid electrically in parallel but spatially separated from one another between specific standardized operating units.

4. A warship in accordance with claim 1 or claim 2, further comprising a special standardized information transmission line for the signals given by a navigation unit, with this standardized information transmission line connecting all the standardized operating units and the communication units which are supplied with the signals into a ring.

5. A warship in accordance with claim 1 or 2 wherein said command post unit is connected via standardized information transmission lines with specific standardized operating units.

6. A warship in accordance with claim 1 or 2 wherein the communication units are connected together and with the command post unit via standardized information transmission lines.

7. A warship in accordance with claim 1 or 2 further comprising a land terminal via which at least one of the functional groups can be connected to an external simulation, diagnosis and/or processing computer.

8. A warship in accordance with claim 1 or 2 wherein said standardized information lines connect all the units of a functional group to a ring.

9. A warship having a central command post unit, a navigation unit, a communication unit, and a plurality of standardized operating units including controlling units and controlled units, each of which includes a container which is closed at the top by a standardized platform, wherein power supply lines and information lines connected to the central command post unit and/or to other standardized operating units terminate at each standardized operating unit, comprising:

a plurality of data processors, each having standardized hardware and software modules and being located inside a standardized operating unit such that the associated standardized operating unit is capable of operating independently of the other standardized operating units, each data processor including a memory for storing data specific to the associated standardized operating unit;

at least one functional group formed from said controlling and controlled standardized operating units;

said data processors of the standardized operating units which belong to the same functional group only exchanging digitized crude information;

standardized information transmission lines laid between the data processors of the standardized operating units of a functional group independently of the nature of the different standardized operating units; and a special standardized information transmission line for transmitting the signals given by said navigation unit, said special transmission line connecting all the standardized operating units and the communication units which are to be supplied with the navigation signals into a ring;

whereby each data processor provides a standardized electronic interface equipped with the same connection contacts and sockets.

* * * * *